Figure 1:
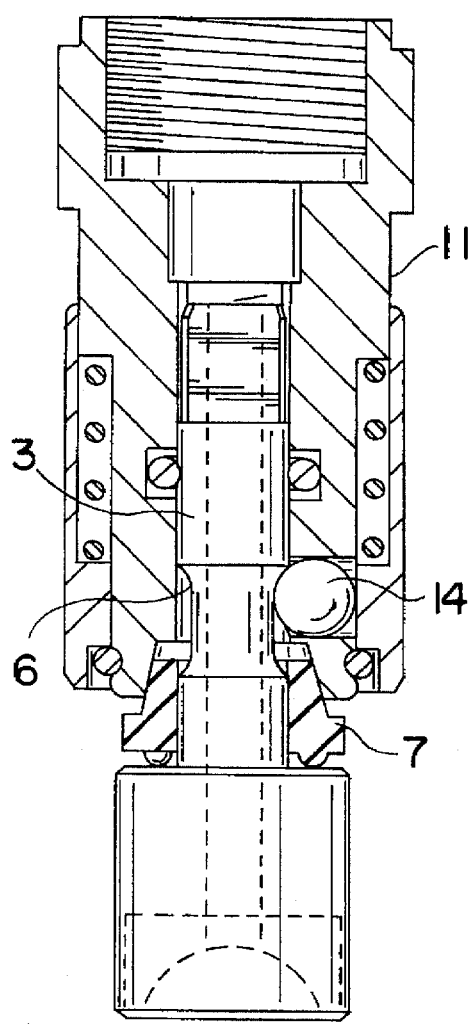

United States Patent [19]

Sidén

[11] Patent Number: 5,688,163
[45] Date of Patent: Nov. 18, 1997

[54] VIBRATION DAMPENING GRINDING CUP AND GRINDING CUP HOLDER FOR HANDHELD GRINDING MACHINES

[75] Inventor: Jan Sidén, Skellefteå, Sweden

[73] Assignee: Uniroc AB, Fagersta, Sweden

[21] Appl. No.: 347,354

[22] PCT Filed: Jun. 9, 1993

[86] PCT No.: PCT/SE93/00509

§ 371 Date: Feb. 21, 1995

§ 102(e) Date: Feb. 21, 1995

[87] PCT Pub. No.: WO93/25346

PCT Pub. Date: Dec. 23, 1993

[30] Foreign Application Priority Data

Jun. 15, 1992 [SE] Sweden .................................. 9201835

[51] Int. Cl.$^6$ ............................................ B24B 41/00

[52] U.S. Cl. .................. 451/342; 279/20; 279/157; 173/210; 408/59

[58] Field of Search ................................ 451/342, 450; 125/11.22; 279/75, 157, 20; 408/57, 59, 143; 173/210, 211

[56] References Cited

U.S. PATENT DOCUMENTS

| | | | |
|---|---|---|---|
| 1,952,003 | 3/1934 | Walsh . | |
| 2,290,215 | 7/1942 | Steinberg . | |
| 2,295,282 | 9/1942 | Mall . | |
| 3,292,976 | 12/1966 | Leavell | 173/210 |
| 4,080,090 | 3/1978 | Kern | 279/20 |
| 4,563,013 | 1/1986 | Hunger et al. | 279/157 |
| 5,070,654 | 12/1991 | Manquist et al. | 51/120 |
| 5,138,797 | 8/1992 | Siden | 51/102 |
| 5,157,873 | 10/1992 | Rudolf et al. | 451/342 |
| 5,203,651 | 4/1993 | Johnson | 408/59 |

FOREIGN PATENT DOCUMENTS

| | | |
|---|---|---|
| 460584 | 10/1989 | Sweden . |
| 2008997 | 6/1979 | United Kingdom . |
| 2081174 | 2/1982 | United Kingdom . |

OTHER PUBLICATIONS

Atlas Copco Rock Tools–Published Aug. 1992.

Primary Examiner—James G. Smith
Assistant Examiner—Dona C. Edwards
Attorney, Agent, or Firm—Mark P. Stone

[57] ABSTRACT

This invention relates to a vibration dampening grinding cup for handheld grinding machines for the grinding of hard metal buttons on button bits, comprising a grinding head and a shaft made with a common axial channel for cooling medium, which distinguishes in that the shaft is formed with a driver part at its free end and an annular groove between this part and the grinding head, and that a bushing of rubber is arranged on the shaft adjacent to the grinding head, and a holder for such a grinding cup, which distinguishes in that it comprises a substantially cylindrical socket with an axial through channel, whose one end is connected with the rotor of the handheld grinding machine and through the other end of which shaft of the grinding cup is intended to be entered for installing the driver part of the shaft in a correspondingly formed driving part of the channel of the socket and to be fastened through introduction of balls situated in holes in the wall of the socket at the other end of the socket into the annular groove of the shaft at the inner edge of the groove by means of a between two stops axially movable sleeve arranged about the socket and biassed towards the other end of the socket by a spring, whereby the bushing with fastened grinding cup rests elastically against the socket and against the grinding head.

4 Claims, 1 Drawing Sheet

VIBRATION DAMPENING GRINDING CUP AND GRINDING CUP HOLDER FOR HANDHELD GRINDING MACHINES

The invention relates to a vibration dampening grinding cup for handheld grinding machines for grinding hard metal buttons on button bits, comprising a grinding head and a shaft made with a common axial channel, and a holder for such a grinding cup.

In handheld grinding machines one has hitherto used a conventional clamping sleeve, so-called chuck, as holder for grinding cups for the clamping of the grinding cup. Through the stationary direct, contact between the grinding cup and the clamping sleeve this connection becomes stiff and vibrations generated in the grinding cup will thus easily be transferred to the handle of the grinding machine and thus to the hands and arms of the operator, which at longer exposure may lead to white fingers, which is a contraction of the blood-vessels restricting the blood circulation in the fingers, and also to nerve damage in the hands.

The aim with the present invention is to prevent that vibrations of the grinding cup are transferred to the hands of the operator and thus prevent that white fingers and nerve damages in the hands arise.

This goal is achieved with the vibration dampening grinding cup and holder for this according to the invention, whereby the grinding cup is distinguished in that the shaft is formed with a driver part at its free end and an annular groove between this part and the grinding head, and that a bushing of rubber is arranged on the shaft adjacent to the grinding head, and the holder with a substantially circular socket with a through channel, whose one end is connected with the rotor of the handheld grinding machine and through the other end of which the shaft of the grinding cup is intended to be inserted for installing the driver part of the shaft in a correspondingly formed driving part of the channel of the socket and to be fastened through introduction of bails situated in holes in the wall of the socket at the other end of the socket into the annular groove in the shaft at the inner edge of the groove by means of a between two stops axially movable sleeve arranged about the socket and biassed towards the other end of the socket by a spring, whereby the bushing with fastened grinding cup elastically bears against the socket and against the grinding head.

Through this coordination of the constructive design of the grinding cup and the holder one obtains, instead of the earlier stationary stiff connection between grinding cup and clamping sleeve, a flexible and through the bushing at the same time vibration dampening connection between grinding cup and holder.

Preferably the bushing has a number of bosses at its side turned towards the grinding head and the form of a truncated cone at its side turned away from the grinding head.

The invention will be better understood and objects other than those set than those set forth above will become apparent when consideration is given to the following detailed description thereof. Such description makes reference to the annexed drawings wherein.

Figure 2:
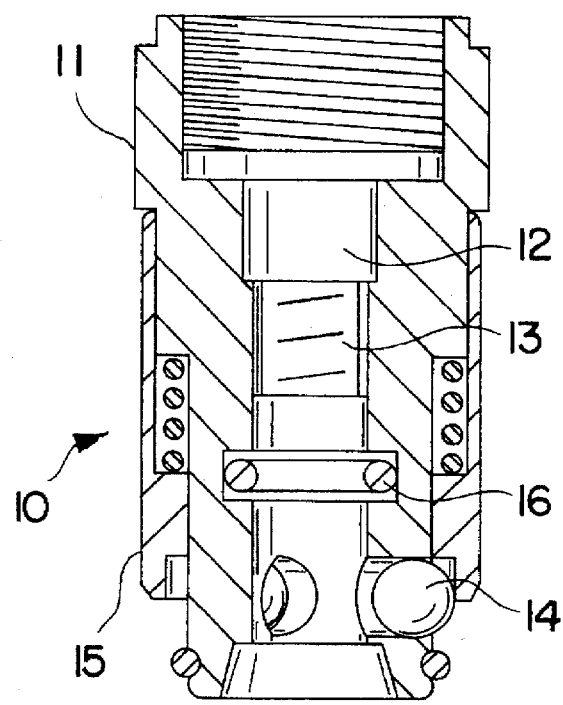
Figure 3:
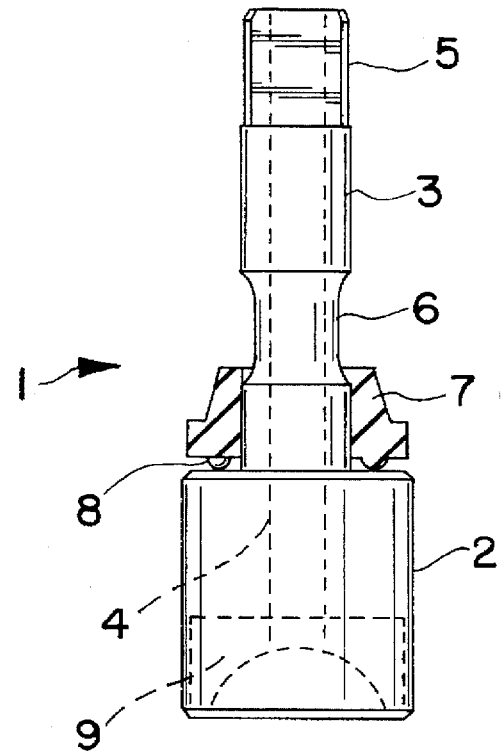

FIG. 1 is a cross-sectional view of the preferred embodiment of the grinding cup and holder connected, FIG. 2 is a cross-sectional view of the holder, and FIG. 3 is a cross-sectional view of the grinding cup.

The invention is described more in detail below with reference to the accompanying drawing in which FIG. 1 schematically and partly in longitudinal section shows a grinding cup and a holder therefor according to the invention connected, FIG. 2 the holder in FIG. 1 separately and FIG. 3 the grinding cup in FIG. 1 separately.

As is shown in the drawing, particularly FIG. 3, the grinding cup 1 according to the present invention comprises a grinding head 2 and a shaft 3 which are made with a common channel 4 for cooling medium, e.g. water or air. In contrast to the shafts of hitherto used grinding cups, in which the shaft is made as a pin with even thickness and circular cross section for fastening in a conventional clamping sleeve of a handheld grinding machine, the shaft 3 of the grinding cup 1 according to the invention is formed with a driver part 5 at its free end and an annular groove 6 between this part and the grinding head and is provided with a bushing 7 of rubber arranged on the shaft adjacent to the grinding head for dampening of those vibrations which are generated in the grinding cup during grinding. FIG. 3 furthermore shows that the bushing at its towards the grinding head turned side has a number of bosses 8 and at its from the grinding head turned side has the form of a truncated cone and that the active part of the grinding head is made as a concavely cupped grinding batch, e.g. of diamonds in a binder, at its free end.

As is shown in the drawing, particularly FIG. 2, the holder according to the present invention comprises a substantially cylindrical socket with an axial through channel 12 whose one end e.g. by internal threads is connected with the rotor of the handheld grinding machine and through the other end of which the shaft of the grinding cup 1 is intended to be introduced for putting the driver part 5 of the shaft into a correspondingly formed driving part 13 in the channel of the socket and to be fastened through introduction of balls 14 situated in holes in the wall of the socket at the other end of the socket into the annular groove 6 of the shaft at the inner edge of the groove by means of a coaxially outside the socket arranged, towards the other end of the socket spring biassed and between two stops axially movable sleeve 15, whereby the bushing, with fastened grinding cup, resiliently rests against the socket and against the grinding head. FIG. 2 further shows that the wall in the channel of the socket between the holes for the balls in the wall of the socket and the driving part is provided with a transversely to the channel extending annular groove in which an O-ring 16 is arranged to prevent the cooling medium from waying out between the shaft of the grinding cup and the channel wall of the socket.

FIG. 1 further shows that the width of the annular groove 6 in the shaft 3 of the grinding cup is larger than the diameter of the balls 14. The balls 14 are intended for fastening of the grinding cup in the holder but primarily intended for preventing the grinding cup from being thrown out of the holder by the cooling medium pressure. When the grinding cup 1 is pressed against a hard metal button to be grinded the inner shaft groove edge is moved upwards from the balls 14 at the same time as the same edge is moved downwards by the cooling medium pressure on the shaft 3, whereby an equilibrium position with the balls separated from the groove edge is obtained and the already in preamble of the description mentioned flexible or floating and through the bushing at the same time vibration dampening connection between grinding cup and holder is obtained.

I claim:

1. Vibration dampening grinding cup (1) for handheld grinding machines for the grinding of hard metal buttons of button bits, comprising a grinding head (2) and a shaft (3) made with a common axial channel (4) for cooling medium, characterized in that the shaft (3) is formed with a driver part (5) at its free end and with an annular groove (6) between this part and the grinding head, that a vibration dampening bushing (7) of rubber is arranged on the shaft adjacent to the grinding head, and that the bushing (7) at its side turned towards the grinding head has a number of bosses (8) and at its side turned away from the grinding head has the form of a truncated cone.

2. Holder (10) for handheld grinding machines for vibration dampening grinding cups for grinding of hard metal buttons of button bits, whereby said grinding cups have a shaft (3) provided with a driver part (5) at its free end and an annular groove (6) situated between the driver part and a grinding head (2) of the grinding cup and that a rubber bushing is arranged on the shaft adjacent the grinding head, characterized in that it comprises a substantially circular socket (11) with an axial through channel (12), whose one end is connected with the rotor of the handheld grinding machine and through the other end of which the shaft (3) of the grinding cup (1) is intended to be introduced for installing the driver part (5) of the shaft in a correspondingly formed driving part (13) of the channel of the socket and to be fastened through introduction of balls (14) situated in holes in the wall of the socket at the other end of the socket into the annular groove (6) in the shaft at the inner edge of the groove by means of a between two stops axially movable sleeve (15) arranged about the socket and biassed towards the other end of the socket by a spring, whereby the bushing with fastened grinding cup elastically rests against the socket and against the grinding head.

3. Holder according to claim 2, characterized in that the wall of the channel in the socket between the holes in the wall for the balls and the driving part is provided with a transversely to the channel extending annular groove in which an O-ring (16) is arranged to prevent the cooling medium from waying out between the shaft of the grinding cup and the channel wall of the socket.

4. Vibration dampening grinding cup (1) for handheld grinding machines for the grinding of hard metal buttons of button bits, comprising a grinding head (2) and a shaft (3) made with a common axial channel (4) for cooling medium, characterized in that the shaft (3) is formed with a driver part (5) at its free end and with an annular groove (6) between this part and the grinding head, and that a vibration dampening bushing (7) of rubber is arranged on the shaft adjacent to the grinding head, said bushing being formed as a truncated cone at a side thereof turned away from said grinding head.

* * * * *